United States Patent
Booman et al.

(10) Patent No.: US 10,922,288 B2
(45) Date of Patent: *Feb. 16, 2021

(54) METHOD FOR STORING DATA ELEMENTS IN A DATABASE

(71) Applicant: International Business Machines Corporation, Armonk, NY (US)

(72) Inventors: Gordon A. Booman, Berlin, MA (US); James L. Finnie, Boeblingen (DE); Oliver Koeth, Stuttgart (DE); Sunil K. Sarin, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/358,758

(22) Filed: Mar. 20, 2019

(65) Prior Publication Data
US 2019/0220448 A1 Jul. 18, 2019

Related U.S. Application Data

(63) Continuation of application No. 14/836,042, filed on Aug. 26, 2015, now Pat. No. 10,282,349.

(51) Int. Cl.
*G06F 16/21* (2019.01)
*G06F 16/22* (2019.01)
*G06F 16/23* (2019.01)

(52) U.S. Cl.
CPC ......... *G06F 16/211* (2019.01); *G06F 16/221* (2019.01); *G06F 16/2282* (2019.01); *G06F 16/2372* (2019.01)

(58) Field of Classification Search
CPC ...................................... G06F 16/211
(Continued)

(56) References Cited

U.S. PATENT DOCUMENTS 5,897,643 A 4/1999 Matsumoto
6,173,361 B1 1/2001 Taketa
(Continued)

OTHER PUBLICATIONS

Thaliaparambil, Vinoy, "Understanding Netezza Zone Maps", IBM DeveloperWorks, IBM PureData—Netezza Developer Network (NDN), May 22, 2014, 5 pages, <https://www.ibm.com/developerworks/community/blogs/Wce085e09749a_4650_a064_bb3f3b738fa3/entry/understanding_netezza_zone_maps?lang=en>.
(Continued)

*Primary Examiner* — Baoquoc N To
(74) *Attorney, Agent, or Firm* — Joseph P. Curcuru; Gilbert Harmon, Jr.

(57) ABSTRACT

In an approach to storing data elements in a database, a database management unit provides a table-mapping file for enabling access to a table of a plurality of tables in a storage medium, the table-mapping file comprising a plurality of map records of a single table, a map record comprising information indicative of the table, a column of the table, a data section of the table, and a range of values of data elements included in the data section of the column. The unit receives a data element at the database via a communication interface, determines the table, column, and data section the data element is to be stored in, and stores the data element in the section file corresponding to the determined table, column and data section. The unit then updates the table-mapping file corresponding to the table, columns and data section the data element has been stored in.

20 Claims, 4 Drawing Sheets

(58) Field of Classification Search
USPC .......................................................... 707/803
See application file for complete search history.

(56) References Cited

U.S. PATENT DOCUMENTS

| | | |
|---|---|---|
| 6,594,666 B1 | 7/2003 | Biswas |
| 6,973,452 B2 | 12/2005 | Metzger et al. |
| 7,103,588 B2 | 9/2006 | Beck et al. |
| 7,440,957 B1 | 10/2008 | Kotidis |
| 8,108,437 B2 | 1/2012 | Helfman |
| 8,266,147 B2 | 9/2012 | Slezak et al. |
| 8,935,233 B2 | 1/2015 | Agrawal et al. |
| 2002/0042788 A1 | 4/2002 | Goralwalla |
| 2002/0057283 A1 | 5/2002 | Biswas |
| 2004/0093342 A1 | 5/2004 | Arbo |
| 2005/0010564 A1 | 1/2005 | Metzger et al. |
| 2006/0039464 A1 | 2/2006 | Emerson |
| 2006/0209826 A1 | 9/2006 | Kawamura |
| 2008/0016112 A1 | 1/2008 | Reddy |
| 2011/0029569 A1 | 2/2011 | Ganesh |
| 2012/0011142 A1* | 1/2012 | Baheti ................ G06K 9/4671 707/769 |
| 2013/0054869 A1 | 2/2013 | Tolia |
| 2015/0032684 A1 | 1/2015 | Gupta |

OTHER PUBLICATIONS

U.S. Appl. No. 14/836,042, filed Aug. 26, 2015.
Appendix P (List of IBM Patents or Patent Applications Treated As Related), 2 pages, filed herewith.
U.S. Appl. No. 15/163,336, filed May 24, 2016.

\* cited by examiner

METHOD FOR STORING DATA ELEMENTS IN A DATABASE

BACKGROUND

The present invention relates to a method for storing data elements in a database and more specifically in a database comprising a plurality of tables which are subdivided into data sections.

One of the challenges of modern data warehouses is the amount of data which has to be processed per every database query. In a naïve approach for each query the whole table or tables of the database addressed by the database query would have to be searched for a single query expression.

The prior art document U.S. Pat. No. 6,973,452 B2 describes an approach for limiting scans of loosely ordered and/or grouped relations using nearly ordered maps. In this approach a large information space is divided into smaller information extents. These extents are annotated with statistics about the information they contain. When a search for information includes a restriction based on value, the desired value ranges can be compared to the value ranges of each extent. If the desired value range lies outside the range of the extent, then the extent cannot hold the desired value and does not need to be included in the search. The nearly ordered map table entries, each entry consisting of a table identifier, a column-index, a minimum data value, a maximum data value and an extent identifier, are grouped by column index, so that all the entries for the $n^{th}$ column of a table are grouped together in a single block.

This approach works well in traditional data warehousing environments where massive amounts of data are inserted in bulk into the data warehouse and the corresponding nearly ordered maps are updated at the same time as the mass data ingest operation. However, in cases where a single table contains multiple columns that benefit from using nearly ordered maps and also in cases where the data is trickle-fed into the data warehouse (that is a relatively small number of records are ingested at a time) the performance overhead of managing the nearly ordered maps can be prohibitive, as for each affected column the block comprising the nearly ordered map entries of the affected column has to be read. This is particularly apparent in environments where transactional data is constantly being fed into the data warehouse to ensure that queries run against the data warehouse include the most up to date information.

SUMMARY

Disclosed herein is an improved method for storing data elements in a database and a corresponding database system and a computer program product as specified in the independent claims. Embodiments of the invention are given in the dependent claims. Embodiments of the present invention can be freely combined with each other if they are not mutually exclusive.

In one aspect the invention relates to a method for storing data elements in a database, the database comprising at least one storage medium, a database management unit and at least one communication interface. The database comprises a plurality of tables, the plurality of tables comprising a plurality of rows, the rows comprising a plurality of columns of data elements. These tables comprised in the database are divided into a plurality of data sections. Each data section of the plurality of data sections comprises a subset of the plurality of rows and/or data elements from a column of the plurality of columns of a table and is stored in an individual data section file in the at least one storage medium of the database.

The method for storing data elements comprises providing at least one table-mapping file for enabling access to a table of the plurality of tables in the storage medium, the table mapping file comprising a plurality of map records of a single table. A map record may comprise information indicative of one or more of: a table from the plurality of tables; a column of the table; a data section of the table; and a range of values of the data elements comprised in the data section of the column.

The method further comprises receiving the data element to be stored in the database at the database via the at least one communication interface. Subsequently the database management unit determines the table, column and data section the data element is to be stored in. Once these parameters have been determined the database management unit stores the data element in the section file corresponding to the determined table, column and data section and updates the table mapping file corresponding to the table, columns and data section the data element has been stored in.

Embodiments may have the advantage that the number of I/O-operations necessary to update the map records of a database can be significantly reduced as will be set forth below.

Usually when new data is inserted into a database, new data is inserted into all columns of one or more tables stored in the database. For example, a database may comprise data for online transactional processing like transactional data of a telephone company. The database may thus comprise at least one table, comprising for example three columns: a first column comprising customer-IDs, a second column comprising dates and/or timestamps and a third column comprising the duration of telephone conversations held by the customer at the date/time indicated by the corresponding entries in the first and second column of the table. Whenever new data is inserted into this table, the data will be inserted in the form of {customer-ID, timestamp, duration} and thus all three columns of the table are affected by the data insertion.

In accordance with the invention in order to update the map records corresponding to the table, column and data section the new data has been stored in it is only necessary to access a single table-mapping file in order to update the map records, as all affected map records will be comprised in this table-mapping file. If however, the map records were for example grouped per column, it would be necessary to access the mapping files of each column affected by the update. Thus, the number of I/O-operations for updating the map records of the table would increase with the number of columns of the table if the map records were grouped by column.

In some embodiment the method further comprises receiving a database query for at least one data element via the communication interface of the database. The database query comprises information indicative of the value or range of values of the queried data elements, a first table comprising the data elements and a first column comprising the data elements. Once the database query has been received, the database management unit accesses the table-mapping file comprising the map records of the first table and determines a first set of data sections. This first set of data sections is characterized in that the value or range of values of the queried data elements is within the ranges of values comprised in the corresponding map records of the table-mapping file. The database management unit then scans the section-files corresponding to the determined first set of data sections for the at least one queried data element.

Embodiments may have the advantage, that the number of section-files which have to be accessed in order to find queried data elements can be significantly reduced. If the range of values of the data elements comprised in a column does not comprise the value or range of values of the queried data elements, the queried data elements cannot possibly be found in the corresponding section file. Thus, it is not necessary for the database management unit to retrieve these section-files from the database storage and scan the section-files for the queried data elements. Instead, using the mapping files a preselection of section-files can be conducted thereby reducing the computational effort of searching for data elements.

Further the embodiment described above may be advantageous in the case of tables comprising only a small number of rows but a huge number of columns. The advantage becomes apparent assuming a database query including predicates across several columns in the table. For example, a database query may specify a customer-ID as well as a range of durations in the exemplary table described above. If the map records of the table which is to be scanned for corresponding data elements are stored in one mapping-file per column it would be necessary to access the mapping-files of all columns the database query includes predicates for in order to read the relevant map records of the table for conducting the pre-selection of section-files described above. If however, all map records are stored together in a single mapping-file, only one I/O-operation is necessary to access all map records of the table.

However, in some embodiments the database further comprises a plurality of column-mapping files stored in the storage medium for enabling access to a column from the plurality of columns. In contrast to a table-mapping file a column-mapping file comprises a plurality of map records of a single column instead of a single table. The database further comprises mapping-policy information for the tables comprised in the database, the policy information being indicative whether to use a table-mapping file or a column-mapping file for enabling access to the data elements comprised in a table.

Using column-mapping files instead of table-mapping files may be advantageous in the case of tables having a huge number of rows but only a limited number of columns or in the case of tables which are usually addressed by database queries comprising predicates for only a limited number of columns. Usually the maximum size of a file, especially a mapping file is limited. Thus, for very long tables it might be necessary to store the map records of a single table in two or even more table-mapping files. For example, the size of a table with respect to the number of rows comprised may be big enough requiring the map records of that table to be stored in 4 individual table-mapping files. However, it may be possible to store all map records of a certain column in a single column-mapping file. Thus, if a query for a data element of a defined column is received, it would only be necessary to access the single column-mapping file instead of accessing 4 individual table mapping files in order to access all map records necessary for the preselection of section files.

Thus, it has to be noted, that both approaches may have their benefits. Grouping map records by table using table-mapping files may be beneficial in case new data is inserted into a database, as described above. Further a table-grouped layout may be beneficial in case of short tables having a huge number of columns when it comes to database queries. However, the column-grouped approach using column-mapping files may be advantageous in case of database queries specifying a column to be searched, especially in the case of very long tables comprising a huge number of rows/datasets. Thus, with an increasing number of rows in a table it may be useful to regroup the map records stored in a table-mapping file and store the corresponding map records in column-mapping files to take advantage of the benefits of a column-grouped approach for long tables described above.

Thus, in some embodiments the database management unit may further determine the number of map records stored in a table-mapping file for example after predefined time period or after a predefined number of database updates. The database management unit may then compare the number of map records with a predefined threshold number. If the number of map records exceeds the predefined threshold number, the database management unit may retrieve the map records from the table-mapping file and store the map records in column-mapping of the column the map records correspond to. For example, the threshold number of map records may correspond to the number of columns of a table. This may have the advantage that as soon as a table becomes too long to capitalize on the effects of table-grouped map records the map records are regrouped in order to use the beneficial effects of a column-grouped layout.

In an alternative embodiment, the database may further comprise at least one access-log file stored in the storage medium, the access-log file comprising information for the tables indicative of a number of operations for storing data elements and/or a number of queries for data elements of the table. The database management unit may then be adapted to determine a ratio of queries to storing operations for a table using the information comprised in the access-log file and compare the determined ratio to a predefined threshold ratio. If the determined ratio exceeds the predefined threshold ratio, the database management unit may retrieve the map records from the table-mapping file and store the map records in the column-mapping file the column the map records correspond to.

As described above the use of table-mapping files may be particularly advantageous in cases where new data is stored in a table, while the use of column-mapping files may be advantageous for database queries. Thus, it may be advantageous to determine whether a table is preferably used for storing data or for retrieving data as expressed by the ratio determined in accordance with the embodiment. In case it is determined, that the table is preferably used for storing new data, the use of table-mapping files may be advantageous. If however, it is determined, that the table is frequently used for database queries it may be useful to regroup the map records of the table and store the map records in column-grouped mapping files. Thus, the benefits of both grouping layouts can be exploited.

In another aspect the invention relates to a database system comprising at least one storage medium, a database management unit and at least one communication interface. The storage medium comprises a plurality of tables, the plurality of tables comprising a plurality of rows, the rows comprising a plurality of columns of data elements. The tables stored in the storage medium are divided into a plurality of data sections, each data section of the plurality of data sections comprising a subset of the plurality of rows and/or data elements from a column of the plurality of columns. Each data section is stored in an individual data section file in the storage medium of the database.

The database system is adapted to provide at least one table mapping file for enabling access to a table of the plurality of tables in the storage medium, the table mapping file comprising a plurality of map records of a single table wherein a map record comprises information indicative of one or more of: a table from the plurality of tables; a column of the table; a data section of the table; and a range of values of the data elements comprised in the data section of the column.

The database system is further adapted to receive the data element at the database via the communication interface, determine the table, column and data section the data element is to be stored in by the database management unit, store the data element in the section file corresponding to the determined table, column and data section and update the table mapping file corresponding to the table columns and data section the data element has been stored in by the database management unit.

In yet another aspect the invention relates to a computer program product comprising machine-executable instructions for performing the method as described above.

BRIEF DESCRIPTION OF THE DRAWINGS

In the following embodiments of the invention are explained in greater detail by way of example only making reference to the drawings in which.

DETAILED DESCRIPTION

Figure 1:
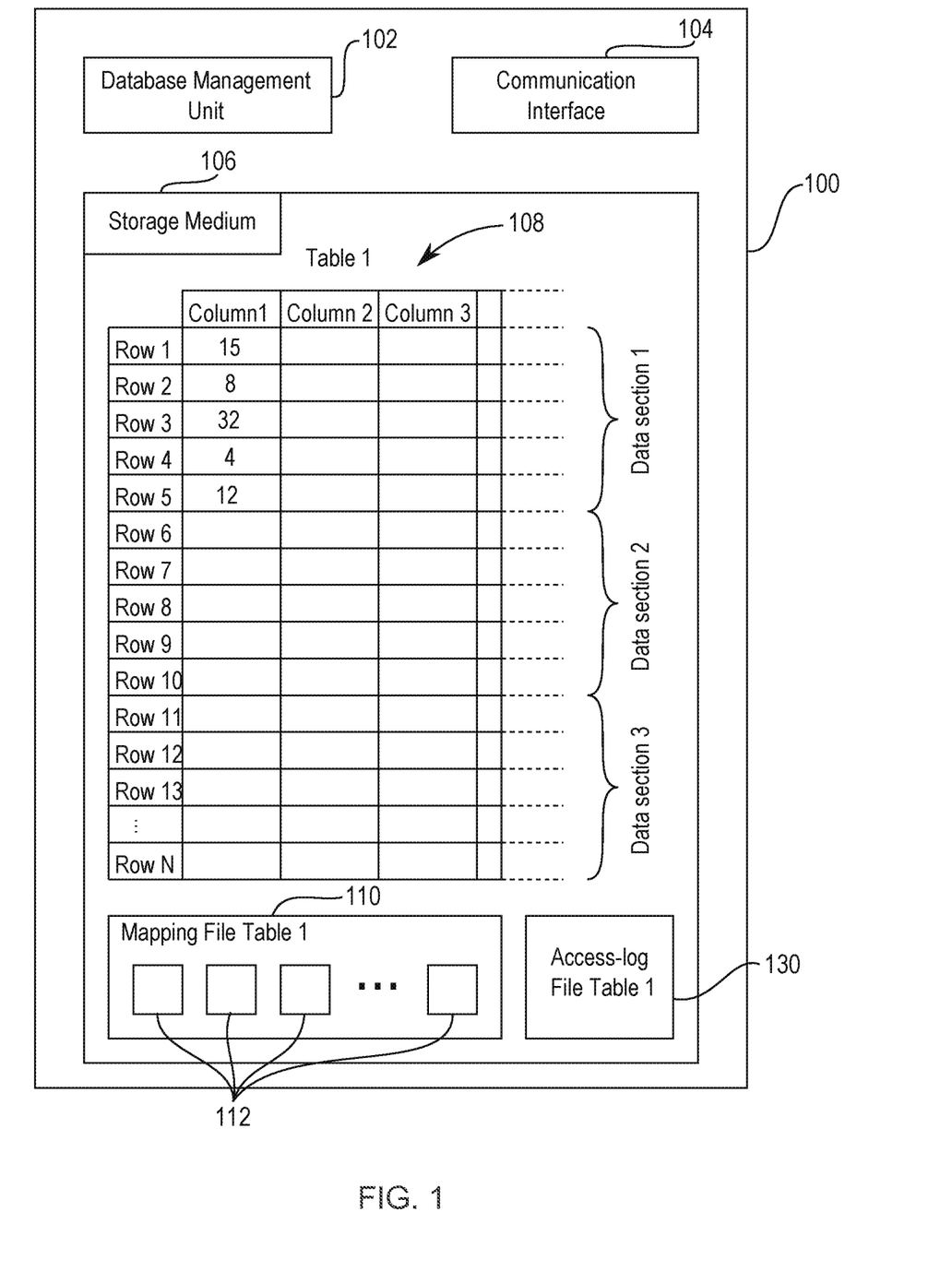
FIG. 1 depicts a block diagram of a database system comprising a table, in accordance with an embodiment of the present invention.

FIG. 1 is a block diagram of a database system 100, the database system 100 comprising a database management unit 102, a communication interface 104 and a storage medium 106. The database management unit 102 may for example comprise a central processing unit comprising one or more single or multi core processing units, the database management unit 102 further being operatively coupled to the communication interface 104 and to the storage medium 106. The database management unit 102 may further comprise a main memory like a random access memory and may be operable to read data from the storage medium 106 and provide the data thus extracted in the main memory for further processing by the processing units of the database management unit 102.

The communication interface 104 may be any kind of interface capable of communicating information from or to the database system 100. As such the communication interface may for example be an ethernet port operable to form a logical connection to a storage area network or a local area network. Using the communication interface 104 it is possible to load data into the storage medium 106 wherein the loading of data into the storage medium 106 is managed by the database management unit 102.

The storage medium 106 may be any kind of digital storage like one or more hard disks, a tape storage, a plurality of solid state disks or any other digital device capable of storing data.

As illustrated in FIG. 1 the storage medium 106 comprises at least one table 108 denoted as Table 1. Table 1 comprises a plurality of columns, in this case column 1, 2 and 3 and a plurality of rows denoted by row 1 to row N. Each row may comprise one data element per column thereby forming datasets. As indicated by the dotted lines to the right of the table 108 it is also possible to introduce more columns without departing from the present disclosure. As is further illustrated in FIG. 1, the table comprised in the storage medium 106 is divided into data sections, in this case into data sections 1, 2 and 3. Each data section comprises a number of rows, in this case data section 1 comprises rows 1-5, data section 2 comprises rows 6-10 and data section 3 comprises rows 11-N. The data comprised in each data section may for example be stored in an individual data section file in the storage medium 106 of the database system 100. A data section file may be identified by using its storage ID within the storage medium 106.

As is further illustrated in FIG. 1 the storage medium 106 further comprises a mapping file 110 for Table 1. The mapping file comprises a plurality of map records 112 which will be described in the following.

Further the storage medium 106 may comprise an access log file 130 for Table 1 which may be understood as a protocol of data storage and data retrieval operations executed on table 1.

Figure 2:
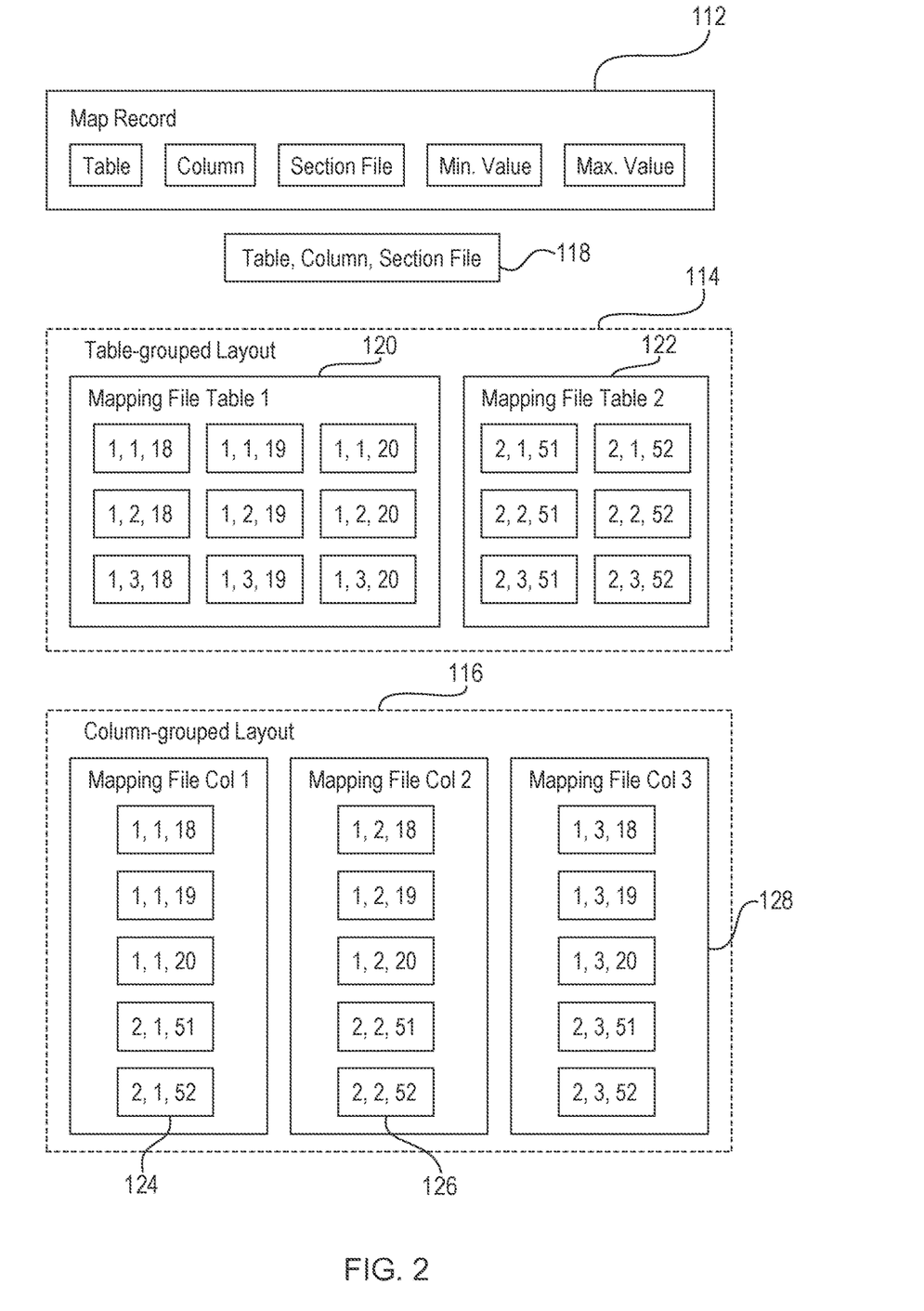
FIG. 2 depicts a schematic of the contents of a map record as well as the table grouped and column grouped layout of mapping files, in accordance with an embodiment of the present invention.

FIG. 2 shows a schematic of a map record 112 as introduced with reference to FIG. 1. The map record 112 comprises statistical data for a chunk of information taken from the table 108 comprised in the storage medium 106 of the database system 100. For example, the map record 112 comprises information indicative of the table the chunk of data originates from, the column the chunk of data is taken from, the section file the data is stored in as well as the minimum value and the maximum value of the data elements stored in the plurality of rows comprised in the chunk of data. Going back to table 108 illustrated in FIG. 1, column 1 may comprise the entries 15 in row 1, 8 in row 2, 32 in row 3, 4 in row 4 and 12 in row 5. As a result, the map record for table 1, column 1 and data section 1 would further comprise the information that the minimum value of the data section is 4 and the maximum value of the data section is 32. This information will also be gathered for the remaining possible combinations of table, column and section file such that each chunk of data that can be analyzed with regards to a minimum and maximum value has a corresponding map record 112 stored in the mapping file 110 for the table.

For example, the columns of table 108 comprised in the storage medium 106 may be indicative of a certain type of information. For example, column 1 may comprise customer IDs, column 2 may comprise a dates and column 3 may comprise a durations of telephone conversations on the dates specified in column 2 held by the user as specified by the corresponding user ID in column 1. The database system 100 may now for example receive a database query, the query asking for all the communication data available for a user with user ID 35. The database management unit 102 may then access the mapping file 110 for the table and search through all the map records 112 thereby determining the chunks of data of column 1 which may comprise the user ID 35. As the value 35 is not within the range given by the minimum value and maximum value of the data section 1 of column 1, the database management unit 102 will discard this corresponding section file as the information queried cannot possibly be found in this section file. Thus, it is possible to discard a plurality of data files which then will not have to be searched in order to execute the database query.

FIG. 2 further comprises a schematic of two possible ways of storing map records 112 in mapping files 110. These two possibilities are a table grouped layout 114 and a column grouped layout 116. In the following a map record 112 is identified by three numbers: the table number, the column number and the section file number as illustrated in the exemplary map record 118.

As an example the storage medium 106 of a database system 100 may comprise two tables with numbers 1 and 2, both tables comprising three columns which are denoted by the numbers 1, 2 and 3. The data comprised in the three columns of table 1 is comprised in three data sections with the section file numbers 18, 19 and 20 wherein the data comprised in the three columns of table 2 is stored in two section files with the numbers 51 and 52. As a result the overall number of map records 112 which have to be stored is 15.

The first example for storing map records 112 is the table grouped layout 114 depicted in FIG. 2. As is illustrated there are two mapping files 120 and 122 wherein the mapping file 120 is the mapping file for table 1 and the mapping file 122 is the mapping file for table 2. As a result, each map record 112 stored in the mapping file 120 has the number 1 on the first position of the map records 112. Accordingly, each map record 112 stored in the mapping file of table 2 122 is denoted by a 2 in the first digit. As a result, mapping file 120 of table 1 comprises 9 map records 112 and the mapping file 122 of table 2 comprises 6 map records 112.

FIG. 2 further depicts a column grouped layout 116 wherein the map records 112 are stored not per table but per column. As a result, there are three mapping files 124, 126 and 128 each mapping file only comprising map records 112 of a single column. As a result, each map record 112 comprised in the mapping file 124 of column 1 has the number 1 on the second digit. Accordingly, the map records 112 stored in the mapping file of column 2 126 have the number 2 on the second digit and the map records 112 stored in the mapping file 128 of column 3 have the number 3 on the second digit.

It has to be noted that with layout 116 a single mapping file may contain map records 112 of both tables. The effect of the layouts 114 and 116 becomes apparent considering that for example a single new row is introduced in table 1 as depicted in FIG. 1. For example, a new row may be introduced as row 4 and is thus part of data section 1. With the introduction of the new row, columns 1, 2 and 3 each now have a new entry which has to be considered regarding the corresponding map records. For example, the data elements thus inserted into the table may have the value 34 in column 1. As a result, the previously described map record 112 for column 1 of table 1 with regard to data section 1 will no longer be valid as the value of 34 is not within the previously defined ranges of 4-32. Thus, it is necessary to update the map record for example by changing the maximum value stored in the map record 112 to 34. The same problem may arise for all columns in which new data elements have been inserted.

In order to change the map records 112 comprised in a mapping file the database management unit 102 will have to read the mapping file 110 from the storage medium 106 and temporarily store the mapping file in the main memory of the database management unit 102 for further processing. Subsequently the database management unit 102 will update the map records 112 comprised in the mapping file and will store the new mapping file 110 in the storage medium 106. As described before the insertion of a new row of data into table 1 may lead to the necessity of updating the map records 112 of table 1 for column 1, 2 and 3 in data section 1. Considering the column-grouped layout 116 it would be necessary to read each mapping file 124, 126 and 128 for columns 1, 2 and 3 from the storage medium 106 in order to update the affected map records 112 comprised in the mapping files. As a result, for a complete update of the map records affected by the insertion of new rows of data into the table, the database management unit 102 has to read, update and store three individual mapping files.

However, with the table grouped layout 114 it will only be necessary to read the mapping file 120 of table 1 as all map records 112 which are affected by the insertion of the new data into the table 1 are comprised in this mapping file 120. Thus, it is only necessary for the database management unit 102 to read a single mapping file, edit the mapping file and store the mapping file 120 back to the storage medium 106. As a result, with the table grouped layout 114 the computational overhead caused by updating the map records 112 affected by the insertion of new data into tables may be significantly reduced compared to the column grouped layout 116.

However, the column-grouped layout 116 may have benefits when it comes to the processing of a database query wherein the database query requires scanning columns of both tables 1 and 2. For example a database query may comprise a clause that both tables 1 and 2 are to be scanned for the same customer_ID comprised in columns with column number 2. Thus, with the example depicted in FIG. 2 there are two tables comprising column 2 and thus both tables will have to be analyzed in order to find the search value as defined by the database query. Using the column grouped layout 116 database management unit 102 will only have to access the mapping file 126 of column 2 in order to analyze all map records 112 corresponding to column 2. If however, the map records 112 are arranged in accordance with the table grouped layout 114 the database management unit 102 would have to access both mapping files 120 and 122 of tables 1 and 2 in order to analyze all map records 112 corresponding to column 2. Thus, the number of input/output operations upon receiving a database query at the database system 100 may be increased with the table grouped layout 114. As a result, it may be useful to deploy both layouts depending on the type of table stored in the database system 100.

A further benefit of the column-grouped layout 116 becomes apparent assuming that the number of map records 112 which can be stored in a single mapping file is for example limited to 10 map records. Further assume that table 1 is updated with new rows of data elements which have to be stored in a new section file, for example because all existing section files of table 1 are already at the limit of their capacity. As a result, there will be 3 new map records 112 for table 1 (one for each column of data comprised in the new section file) which have to be stored in a corresponding mapping file. Considering the table-grouped layout 114, at least 2 of the new map records 112 will have to be stored in a new mapping file for table 1, as the mapping file 120 of table 1 already comprises 9 map records 112. Considering the column-grouped layout 116 no new mapping files have to be created, as the mapping files 124, 126 and 128 so far only comprise 5 map records 112 each and only a single new map record 112 has to be stored per column. Thus, after the database update there will be two mapping files for table 1 in the table-grouped layout 114 and still one mapping file per column in the column-grouped layout 116.

If in this new situation a database query specifies for example a certain value for a data element comprised in column 1 of table 1 the database management unit 102 would have to access both mapping files for table 1 in case of a table grouped-layout 114 in order to read all map records 112 referring to column 1 of table 1. However, considering the column-grouped layout 116 the database management unit 102 would only have to read the updated mapping file 124 of column 1 in order to access all map records 112 referring to column 1 of table 1.

Figure 3:
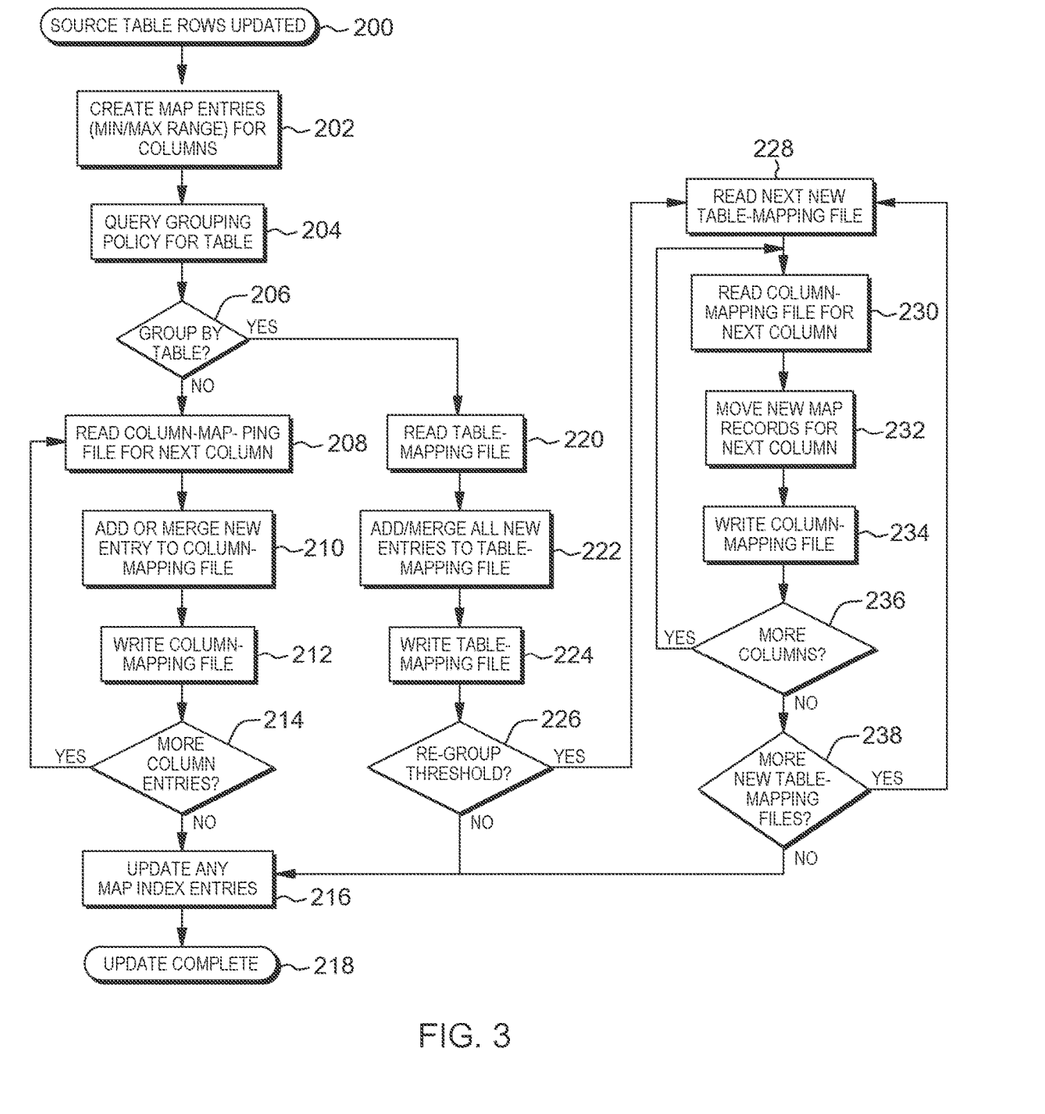
FIG. 3 depicts a flow diagram of a method for storing data elements in a database and updating the corresponding mapping files, in accordance with an embodiment of the present invention.

FIG. 3 is a flow diagram of a method for storing data elements in a database system 100 and updating the corresponding mapping files. The method starts with the updating of a source table, for example by introducing new rows of data to the table, step 200. In a subsequent step 202, the method creates map entries (min/max range) for columns. The map records are created for the columns of the tables which are affected by the update introducing new rows. To this end the newly created map records may comprise a minimum and a maximum value of the data elements which have been introduced into the individual columns. These new map records are introduced into the mapping files of the tables affected by the data update. To this end, in step 204, a grouping policy for the tables which are affected by the data update is queried. As described with reference to FIG. 2 it is possible either to group map records by table or group map records by column.

If it is determined that the map records for the table affected by the data update are to be grouped not per table but per column (decision step 206, "no" branch), the database management unit 102 of a database system 100 will read the column-mapping file, for example, column-mapping file 110, for a first column of the plurality of columns affected by the data update, step 208. This column mapping file is then updated by adding or merging the new entries which have been determined in step 202 into the column-mapping file read by the database management unit 102, step 210. In step 212, the updated column mapping file is then written, or stored, in the storage medium 106. In step 214, the method determines if there are more column entries which are affected by the data update. If this is the case (decision step 214, "yes" branch), the method returns to step 208 and the column mapping file for the next column is read from the storage medium 106 by the database management unit 102. Subsequently the column mapping file is updated and stored in storage medium 106. This procedure is repeated until the mapping files of all columns affected by the data update and comprising data which can be used in the context of map records have been updated. As a result, in step 214 it will be determined that there are no more column entries (decision step 214, "no" branch), the method will continue with step 216 which is the updating of any map index entries whereupon the update procedure is complete at step 218.

If in step 206 it is determined that the grouping policy for the table affected by the data update is to group map records 112 per table (decision step 206, "yes" branch), the method continues with the step 220 in which the database management unit 102 reads the corresponding table-mapping file for the table from the storage medium 106 and stores it in main memory. In a subsequent method step 222, the database management unit 102 adds or merges all the new entries which have been determined in method step 202 into the table mapping file and writes, or stores, the new table mapping file in the storage medium 106 in step 224. Once the table mapping file has been updated in accordance with method steps 220, 222 and 224 it is then determined if a regrouping threshold has been reached, decision step 226. If this is not the case (decision step 226, "no" branch), the method continues with the method step 216 with the updating of any map index entries and subsequently the procedure is complete in step 218.

If however, it is determined in step 226 that a regrouping threshold has been reached (decision step 226, "yes" branch), the method will continue with method step 228. In this case regrouping means that the mapping files which are arranged in accordance with the table grouped layout 114 depicted in FIG. 2 have to be rearranged to comply with the column grouped layout 116.

In method step 228, the database management unit 102 reads a first new table mapping file from the storage medium 106. Subsequently in method step 230, the column mapping file of a first column corresponding to the table of the table mapping file is read from the storage medium 106. In method step 232, the new map records comprised in the first new table mapping file are moved to the column mapping file for the first column. As a result, the column mapping file for the first column has been updated and can be written, or stored, in the storage medium 106 in method step 234.

In step 236, it is then determined whether the first new table mapping file comprises more map records which correspond to a different column. If this is the case (decision step 236, "yes" branch), the database management unit 102 reads the column mapping file for a next column in step 230 and moves the corresponding map records from the first new table mapping file to the new column mapping file and store the column mapping file in the storage medium 106. This is repeated until no more columns are affected by the new map records stored in the first new table mapping file (decision step 236, "no" branch). As a result, the method will continue with step 238 in which it is determined if there are more new table mapping files. For example, it is possible that the data update affected more than a single table. In this case (decision step 238, "yes" branch), the method steps 228-236 will be repeated as described above for the second new table-mapping file. As soon as all new table mapping files have been converted into the column grouped layout (decision step 238, "no" branch), the method continues with method step 216 and the map index entries of the mapping files are updated. The method for storing new data in the database ends with step 218.

Figure 4:
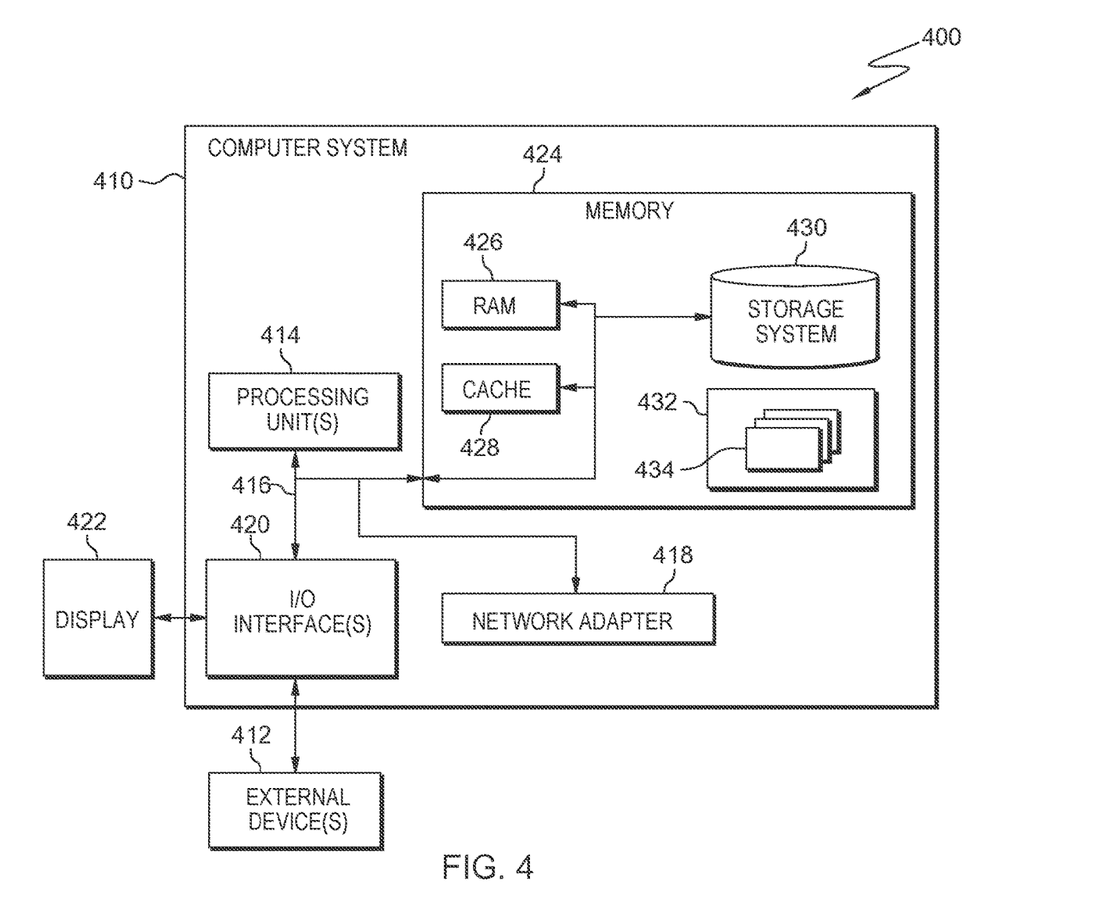
FIG. 4 depicts a block diagram of components of a data processing system, such as the database system of FIG. 1, in accordance with an embodiment of the present invention.

FIG. 4 depicts a block diagram of components of a data processing system, generally designated 400, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, database system 100 of FIG. 1 can be shown in the form of a general-purpose computing device, such as computer system 410. The components of computer system 410 may include, but are not limited to, one or more processors or processing unit 414, memory 424, and bus 416 that couples various system components including memory 424 to processing unit(s) 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external device(s) 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Possible combination of features described above can be the following:

1. A method for storing data elements in a database (100) comprising at least one storage medium (106), a database management unit (102) and at least one communication interface (104), the database comprising a plurality of tables (108), the plurality of tables comprising a plurality of rows, the rows comprising a plurality of columns of data elements, the tables (108) being divided into a plurality of data sections, each data section of the plurality of data sections comprising a subset of the plurality of rows and/or data elements from a column of the plurality of columns, each data section being stored in an individual data section-file in the at least one storage medium (106), the method comprising:

providing at least one table-mapping file (110) for enabling access to a table (108) of the plurality of tables in the storage medium (106), the table-mapping file (108) comprising a plurality of map records (112) of a single table, a map record (112) comprising information indicative of a table (108) from the plurality of tables, a column of the table (108), a data section of the table (108), a range of values of the data elements comprised in the data section of the column, receiving the data element at the database (100) via the at least one communication interface (104), determining the table (108), column, and data section the data element is to be stored in by the database management unit (102), storing the data element in the section file corresponding to the determined table (108), column and data section by the database management unit (102), and updating the table-mapping file (110) corresponding to the table (108), columns and data section the data element has been stored in by the database management unit (102).

2. The method of feature combination 1, the method further comprising receiving a database query for at least one data element via the communication interface (104), the database query comprising an information indicative of the value or range of values of the queried data elements, a first table comprising the data elements and a first column comprising the data elements, accessing the table-mapping file (110) comprising the map records (112) of the first table by the database management unit (102), determining a first set of data sections for which the value or range of values of the queried data elements is within the ranges of values comprised in the corresponding map records by the database management unit (102), and scanning the section-files corresponding to the determined first set of data sections for the queried data elements by the database management unit (102).

3. The method of feature combination 1 or 2, the updating of the table-mapping file (110) further comprising:

determining by the database management unit (102) whether a map record (112) corresponding to the table, column and data section the data element has been stored in already exists, if the map record (112) exists, updating the map record (112) by the database management unit (102), and if no such map record (112) exists, creating a new map record (112) for the table, column and data section the data element has been stored in using the value of the data element as range of values by the database management unit (102).

4. The method of feature combination 3, the updating of the map record (112) comprising:
  determining the value of the data element by the database management unit (102),
  comparing the value of the data element with the range of values comprised in the map record (112) by the database management unit (102), and
  if the value of the data element is not within the range of values, extending the range of values to the value of the data element by the database management unit (102).

5. The method of any of the preceding feature combinations, the database (100) further comprising a plurality of column-mapping files stored in the storage medium (106) for enabling access to a column from the plurality of columns, a column-mapping file comprising a plurality of map records (112) of a single column, the database (100) further comprising mapping-policy information for the tables (108) comprised in the database (100), the policy information being indicative whether to use a table-mapping file or a column-mapping file for enabling access to the data elements comprised in a table (108).

6. The method of feature combination 5, further comprising:
  determining the number of map records (112) stored in a table-mapping file by the database management unit (102),
  comparing the number of map records (112) with a predefined threshold number by the database management unit (102), and
  if the number of map records (112) exceeds the predefined threshold number, retrieving the map records (112) from the table-mapping file (110) and storing the map records in the column-mapping file of the column the map records correspond to by the database management unit (102).

7. The method of feature combination 6, the threshold number being defined as the number of columns of the table (108) corresponding to the table-mapping file (110).

8. The method of feature combination 5, the database (100) further comprising at least one access-log file (130) stored in the storage medium (106), the access-log file (130) comprising information for the tables (108) indicative of a number of operations for storing data elements and/or a number of queries for data elements of a table (108), the method comprising:
  determining a ratio of queries to storing operations for a table (108) using the information comprised in the access-log file (130) by the database management unit (102),
  comparing the determined ratio to a predefined threshold ratio by the database management unit (102), and
  if the determined ratio exceeds the predefined threshold ratio, retrieving the map records (112) from the table-mapping file and storing the map records (112) in the column-mapping file of the column the map records (112) correspond to by the database management unit (102).

9. A database system (100) comprising at least one storage medium (106), a database management unit (102) and at least one communication interface (104), the storage medium (106) comprising a plurality of tables (108), the plurality of tables (108) comprising a plurality of rows, the rows comprising a plurality of columns of data elements, the tables (108) being divided into a plurality of data sections, each data section of the plurality of data sections comprising a subset of the plurality of rows and/or data elements from a column of the plurality of columns, each data section being stored in an individual data section-file in the storage medium (106), the database system (100) being adapted to:
  provide at least one table-mapping file (110) for enabling access to a table (108) of the plurality of tables in the storage medium (106), the table-mapping file (110) comprising a plurality of map records (112) of a single table, a map record (112) comprising information indicative of
    a table from the plurality of tables,
    a column of the table,
    a data section of the table,
    a range of values of the data elements comprised in the data section of the column,
  receive the data element at the database system (100) via the communication interface (104),
  determine the table, column and data section the data element is to be stored in by the database management unit (102),
  store the data element in the section file corresponding to the determined table, column and data section by the database management unit (102), and
  update the table-mapping file (110) corresponding to the table, column and data section the data element has been stored in by the database management unit (102).

10. A computer program product comprising machine executable instructions for performing the method of any of the feature combinations 1-8.

What is claimed:
1. A method for storing a first data element in a database comprising at least one storage medium, a database management unit and at least one communication interface, the database comprising a plurality of tables, the plurality of tables comprising a plurality of rows, the rows comprising a plurality of columns of data elements, the tables being divided into a plurality of data sections, each data section of the plurality of data sections comprising a subset of the plurality of rows and one or more data elements from a column of the plurality of columns, each data section being stored in an individual data section-file in the at least one storage medium, the method comprising:
  providing, by a computer processor, at least one table-mapping file for enabling access to a table of the plurality of tables in the storage medium;
  receiving, by the computer processor, the first data element at the database via the at least one communication interface;
  determining, by the computer processor, the table, column, and data section the first data element is to be stored in by the database management unit;
  determining, by the computer processor, a ratio of queries to storing operations for the table using information included in an access-log file by the database management unit;
  comparing, by the computer processor, the determined ratio to a predefined threshold ratio by the database management unit;
  if the determined ratio exceeds the predefined threshold ratio, retrieving, by the computer processor, a plurality of map records from the at least one table-mapping file;
  storing, by the computer processor, the first data element in the individual data section-file corresponding to the determined table, column and data section by the database management unit; and updating, by the computer processor, the at least one table-mapping file corresponding to the table, columns and data section the first data element has been stored in by the database management unit.

2. The method of claim 1, the method further comprising:

receiving, by the computer processor, a database query for at least one data element via the communication interface, the database query comprising an information indicative of a value or range of values of the queried at least one data element, a first table comprising the one or more data elements and a first column comprising the one or more data elements; and accessing, by the computer processor, the at least one table-mapping file comprising the plurality of map records of the first table by the database management unit.

3. The method of claim 2 further comprising:

determining, by the computer processor, a first set of data sections for which the value or range of values of the queried at least one data element is within a ranges of values included in corresponding map records by the database management unit; and scanning, by the computer processor, one or more section-files corresponding to the determined first set of data sections for the queried at least one data element by the database management unit.

4. The method of claim 1, the updating of the at least one table-mapping file further comprising:

determining, by the computer processor, by the database management unit whether a map record corresponding to the table, the column and the data section the first data element has been stored in already exists; and responsive to determining the map record exists, updating, by the computer processor, the map record by the database management unit.

5. The method of claim 4, further comprising:

responsive to determining no such map record exists, creating, by the computer processor, a new map record for the table, column and data section the first data element has been stored in using a value of the first data element as a range of values by the database management unit.

6. The method of claim 4, the updating of the map record comprising:

determining, by the computer processor, a value of the first data element by the database management unit;

comparing, by the computer processor, the value of the first data element with a range of values included in the map record by the database management unit; and if the value of the first data element is not within the range of values, extending, by the computer processor, a range of values to the value of the first data element by the database management unit.

7. The method of claim 1, further comprising:

determining, by the computer processor, a number of the plurality of map records stored in the table-mapping file by the database management unit;

comparing, by the computer processor, the number of the plurality of map records with a predefined threshold number by the database management unit; and if the number of the plurality of map records exceeds the predefined threshold number, retrieving, by the computer processor, the plurality of map records from the table-mapping file and storing the plurality of map records in the column-mapping file of the column the plurality of map records correspond to by the database management unit.

8. The method of claim 7, the threshold number being defined as a number of columns of the table corresponding to the table-mapping file.

9. The method of claim 1 wherein the database further comprises: mapping-policy information for the tables included in the database, the policy information being indicative of whether to use a table-mapping file or a column-mapping file for enabling access to the one or more data elements included in a table, at least one access-log file stored in the storage medium, the access-log file comprising information for the tables indicative of a number of operations for storing one or more data elements and a number of queries for one or more data elements of a table.

10. A computer system for storing a first data element in a database comprising at least one storage medium, a database management unit and at least one communication interface, the database comprising a plurality of tables, the plurality of tables comprising a plurality of rows, the rows comprising a plurality of columns of data elements, the tables being divided into a plurality of data sections, each data section of the plurality of data sections comprising a subset of the plurality of rows and one or more data elements from a column of the plurality of columns, each data section being stored in an individual data section-file in the at least one storage medium, the computer system comprising:

one or more computer processors;

one or more computer readable storage devices;

program instructions stored on the one or more computer readable storage devices for execution by at least one of the one or more computer processors, the stored program instructions comprising:

program instructions to provide at least one table-mapping file for enabling access to a table of the plurality of tables in the storage medium;

program instructions to receive the first data element at the database via the at least one communication interface;

program instructions to determine a ratio of queries to storing operations for the table using information included in an access-log file by the database management unit;

program instructions to compare the determined ratio to a predefined threshold ratio by the database management unit;

if the determined ratio exceeds the predefined threshold ratio, program instructions to retrieve a plurality of map records from the at least one table-mapping file;

program instructions to store the first data element in a section file corresponding to the determined table, column and data section by the database management unit; and program instructions to update the at least one table-mapping file corresponding to the table, columns and data section the first data element has been stored in by the database management unit.

11. The computer system of claim 10, further comprising:

program instructions to receive a database query for at least one data element via the communication interface, the database query comprising an information indicative of a value or range of values of the queried at least one data element, a first table comprising the one or more data elements and a first column comprising the one or more data elements;

program instructions to access the at least one table-mapping file comprising the plurality of map records of the first table by the database management unit;

program instructions to determine a first set of data sections for which the value or range of values of the queried at least one data element is within a ranges of values included in corresponding map records by the database management unit; and program instructions to scan one or more section-files corresponding to the determined first set of data sections for the queried at least one data element by the database management unit.

12. The computer system of claim 10, wherein the updating of the at least one table-mapping file further comprising:

program instructions to determine by the database management unit whether a map record corresponding to the table, the column and the data section the first data element has been stored in already exists;

responsive to determining the map record exists, program instructions to update the map record by the database management unit;

responsive to determining no such map record exists, program instructions to create a new map record for the table, column and data section the first data element has been stored in using a value of the first data element as a range of values by the database management unit;

program instructions to determine the value of the first data element by the database management unit;

program instructions to compare the value of the first data element with the range of values included in the map record by the database management unit; and if the value of the first data element is not within the range of values, extending, by the computer processor, a range of values to the value of the first data element by the database management unit.

13. The computer system of claim 10, further comprising:

program instructions to determine a number of the plurality of map records stored in the table-mapping file by the database management unit;

program instructions to compare the number of the plurality of map records with a predefined threshold number by the database management unit, wherein the threshold number being defined as a number of columns of the table corresponding to the table-mapping file; and if the number of the plurality of map records exceeds the predefined threshold number, retrieving, by the computer processor, the plurality of map records from the table-mapping file and storing the plurality of map records in the column-mapping file of the column the plurality of map records correspond to by the database management unit.

14. The computer system of claim 10 wherein the database further comprises:

mapping-policy information for the tables included in the database, the policy information being indicative of whether to use a table-mapping file or a column-mapping file for enabling access to the one or more data elements included in a table, at least one access-log file stored in the storage medium, the access-log file comprising information for the tables indicative of a number of operations for storing one or more data elements and a number of queries for one or more data elements of a table.

15. The computer system of claim 10, wherein the at least one table-mapping file comprises a plurality of map records of a single table, a map record comprising information indicative of one or more of: a table from the plurality of tables, a column of the table, a data section of the table, and a range of values of the one or more data elements included in the data section of the column.

16. A computer program product for storing a first data element in a database comprising at least one storage medium, a database management unit and at least one communication interface, the database comprising a plurality of tables, the plurality of tables comprising a plurality of rows, the rows comprising a plurality of columns of data elements, the tables being divided into a plurality of data sections, each data section of the plurality of data sections comprising a subset of the plurality of rows and one or more data elements from a column of the plurality of columns, each data section being stored in an individual data section-file in the at least one storage medium, the computer program product comprising:

one or more computer readable storage media and program instructions stored on the one or more computer readable storage media, the program instructions executable by a computer processor to cause the computer processor to perform a method comprising:

program instructions to provide at least one table-mapping file for enabling access to a table of the plurality of tables in the storage medium;

program instructions to receive the first data element at the database via the at least one communication interface;

program instructions to determine the table, column, and data section the first data element is to be stored in by the database management unit;

program instructions to determine a ratio of queries to storing operations for the table using information included in an access-log file by the database management unit;

program instructions to compare the determined ratio to a predefined threshold ratio by the database management unit;

if the determined ratio exceeds the predefined threshold ratio program instructions to retrieve a plurality of map records from the at least one table-mapping file;

program instructions to store the first data element in the individual data section-file corresponding to the determined table, column and data section by the database management unit; and program instructions to update the at least one table-mapping file corresponding to the table, columns and data section the first data element has been stored in by the database management unit.

17. The computer program product of claim 16, the further comprising:

program instructions to receive a database query for at least one data element via the communication interface, the database query comprising an information indicative of a value or range of values of the queried at least one data element, a first table comprising the one or more data elements and a first column comprising the one or more data elements;

program instructions to access the at least one table-mapping file comprising the plurality of map records of the first table by the database management unit;

program instructions to determine a first set of data sections for which the value or range of values of the queried at least one data element is within a ranges of values included in corresponding map records by the database management unit; and program instructions to scan one or more section-files corresponding to the determined first set of data sections for the queried at least one data element by the database management unit.

18. The computer program product of claim 16, wherein the updating of the at least one table-mapping file further comprising:
    program instructions to determine by the database management unit whether a map record corresponding to the table, the column and the data section the first data element has been stored in already exists; and
    responsive to determining the map record exists, program instructions to update the map record by the database management unit;
    responsive to determining no such map record exists, program instructions to create a new map record for the table, column and data section the first data element has been stored in using a value of the first data element as a range of values by the database management unit;
    program instructions to determine a value of the first data element by the database management unit;
    program instructions to compare the value of the first data element with the range of values included in the map record by the database management unit; and
    if the value of the first data element is not within the range of values, program instructions to extend a range of values to the value of the first data element by the database management unit.

19. The computer program product of claim 16, further comprising:
    program instructions to determine a number of the plurality of map records stored in the table-mapping file by the database management unit;
    program instructions to compare the number of the plurality of map records with a predefined threshold number by the database management unit, wherein the threshold number being defined as a number of columns of the table corresponding to the table-mapping file; and
    if the number of the plurality of map records exceeds the predefined threshold number, program instructions to retrieve the plurality of map records from the table-mapping file and storing the plurality of map records in the column-mapping file of the column the plurality of map records correspond to by the database management unit.

20. The computer program product of claim 16 wherein the database further comprises: mapping-policy information for the tables included in the database, the policy information being indicative of whether to use a table-mapping file or a column-mapping file for enabling access to the one or more data elements included in a table, at least one access-log file stored in the storage medium, the access-log file comprising information for the tables indicative of a number of operations for storing one or more data elements and a number of queries for one or more data elements of a table.

* * * * *